United States Patent Office 2,761,779
Patented Sept. 4, 1956

2,761,779
METHOD OF MAKING PULP PRE-FORMS AND PRODUCTS THEREOF

Richard Lindenfelser, Darien, and Martha Katherine Kilthau, Cos Cob, Conn., assignors to American Cyanamid Company, New York, N. Y., a corporation of Maine No Drawing. Application April 29, 1952,
Serial No. 285,068

15 Claims. (Cl. 92—21)

This application is a continuation-in-part of our copending application Serial No. 102,948, filed July 2, 1949, and now abandoned.

This invention relates to pulp pre-forms wherein are utilized resinous compositions or materials having certain particular and peculiar properties that make them eminently suitable for use as the resin component of such pre-forms, and includes both process and product features.

The present invention is based on our discovery that curable resinous materials which are particularly adapted for use as the resin components of resin pulp pre-forms can be prepared by initiating reaction between ingredients comprising (1) an aldehyde, e. g., formaldehyde, paraformaldehyde, etc., and (2) an aminotriazine represented by the general formula

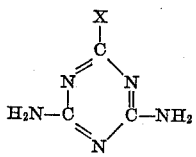

where X represents a radical selected from the class consisting of cycloaliphatic hydrocarbon radicals, aralkyl hydrocarbon radicals, aryl hydrocarbon radicals and acyclic aliphatic hydrocarbon radicals containing from 2 to 7 carbon atoms, inclusive. The reaction between the reactive ingredients is initiated at any suitable temperature, e. g., at room temperature (20°–30° C.) or at any convenient or suitable elevated temperature, e. g., at from 40° C. to 100° C.; under various pH conditions, for example at a pH of the reaction mass ranging from about 4 to about 11; and in the presence or absence of a solvent, a condensation catalyst, a modifying additive or additives, etc., as desired or as conditions may require. Thereafter the reaction between the aforesaid ingredients of (1) and (2) is continued under pH conditions ranging from about 4 to about 11 and at a temperature of from about 60° C. to about 200° C., preferably at a temperature of from about 80° C. to about 105° C. and at atmospheric, subatmospheric or superatmospheric pressure, until a resinous condensation product is produced which has a plasticity not exceeding about 60 mils as determined by the Cyanamid test method (hereinafter described) and which also, in finely powered form, will not cake in water at 20° C. In carrying out the above-described method the ingredients of (1) and (2) are employed in a molar ratio of from about 1:1 to about 4:1, and preferably in a molar ratio of from about 1.5:1 to about 2.5:1. These resinous compositions are then used in making resin pulp pre-forms as hereinafter described. The pulp pre-forms are molded under heat and pressure to cure the resin in situ and to consolidate the mass.

In the past, light-colored and light-stable, high-impact molding materials have been prepared by incorporating into a molding composition comprising a light-colored, light-stable, thermosetting resin such as a urea or melamine resin, a filler of high mechanical strength such as long-fibered pulp, chopped cloth or cord, and the like. Such filled molding compositions are bulky, they handle poorly, and they possess poor flow characteristics for molding. On the other hand darker colored, high-impact molding materials have, in the past, been made by a process which eliminates the poor handling, high bulk and poor flow of the above-described, filled molding compositions. This process, known as the pulp resin pre-form process, is described in U. S. Patent No. 2,274,095. It involves the incorporation of a resin such as a phenolformaldehyde resin with an aqueous pulp mixture, followed by shaping of the mixture of resin and pulp and finally drying of the mixture to produce a material which is known as a "pulp resin pre-form" or "resin pulp pre-form." A single pre-form can be molded, or a plurality of layers of pulp resin pre-forms can be consolidated and combined by the application thereto of heat and pressure.

Attempts to apply the pulp resin pre-form process for the production of colored, high-impact molding materials to the production of similar light-colored and light-stable materials have been largely unsuccessful because the light-stable resins such as melamine and urea resins are too water-soluble for such an application and it is therefore difficult to obtain the proper retention of resin in the aqueous pulp mixture. The use of saturated aqueous solutions of urea or melamine resins has been tried but this is an impractical expedient since the preparation of pre-forms is unduly complicated by additional processing steps which are required. Furthermore, it has been attempted to utilize urea or melamine resins which are in an advanced stage of polymerization and therefore have decreased water-solubility, but molding compositions containing these resins have relatively poor flow properties because of the increased viscosity of the resin.

It is a primary object of the present invention to prepare, and use in making pulp pre-forms, resinous compositions having certain particular and peculiar properties that make them eminently suitable for use in resin pulp pre-forms.

Another object of the invention is to provide a novel and improved process utilizing resinous materials of the kind broadly described in the preceding paragraph from a particular class of aminotriazines.

Other objects of the invention will be apparent to those skilled in the art from the following more detailed description.

We have found that, by employing certain triazine resins prepared according to this invention (these resins possessing the advantage over urea and melamine resins of very low solubility in water together with other advantages also possessed by melamine and urea resins including light stability and good color), the pulp resin pre-form process can be applied to the production of light-colored and light-stable, high-impact molded or laminated articles of high mechanical strength.

The invention will be described in greater detail in conjunction with the following specific examples which are merely illustrative and not intended to limit the scope of the invention. Proportions are given in parts by weight.

EXAMPLE 1

30 parts of bleached hardwood sulfite pulp
70 parts of resin "A"
2.8 parts of benzoic acid
0.5 part of alum
1 part of zinc stearate
9970 parts of water The resin, alum, benzoic acid, zinc stearate and part of the water are blended for ten minutes in a device designed to produce very high-speed agitation, and a 2% slurry of the pulp in water is made up in a paper beater. The pulp slurry is added, together with the remaining water, to the resin mixture and there agitated at a medium speed, care being taken that the pulp fibers are not cut. The slurry is then sucked through a 60 x 80 mesh screen on a paper-sheeting machine.

The sheets, so formed readily with negligible loss of either resin or pulp, are dried for two hours at 40° C. and then conditioned for 16 hours at 25° C. at 40% relative humidity.

A number of the above sheets are superimposed one on another and molded at 310° F. and 3700 p. s. i. The resulting molded pieces have the following properties.

a. Appearance—hard, glossy, light-colored
b. Flow—good
c. Time to cure—4 to 8 minutes
d. Water absorption at optimum cure, 30 minute immersion in boiling water—0.27%
e. Flexural strength—8400 p. s. i.
f. Deflection—0.120 in.
g. Mold shrinkage—0.0065 in.
h. Taber abrasion resistance—0.022–0.026 gram loss per 1000 cycles
i. Arc resistance—44 secs.
j. Heat distortion—134° C.
k. Light stability—no discoloration after 50 hours exposure to a General Electric S-1 Sunlamp

EXAMPLE 2

40 parts of bleached hardwood sulfite
60 parts of resin "A"
2.4 parts of oxalic acid
0.5 part of alum
1 part zinc stearate
9960 parts of water The procedure of Example 1 is followed. The flow properties of the molding compound are good, and the molded pieces are satisfactory in appearance and properties.

EXAMPLE 3

40 parts of bleached hardwood sulfite pulp in 1960 parts water
60 parts of resin "A"
2.4 parts of benzoic acid
0.5 part of alum
1 part of zinc stearate
5 parts of zinc sulfide
8000 parts of water The procedure of Example 1 is followed with the single exception that the sheets are dried at 70° C. for 1 hour before conditioning.

Pieces molded from a few plies of the sheets prepared as described above at 310° F. and 3700 p. s. i. have the following properties:

a. Appearance—hard, glossy, light-colored
b. Flow—good
c. Time to cure—5–10 minutes
d. Water absorption at optimum cure—30 min. immersion in boiling water—0.32%
e. Flexural strength—13,011–13,800
f. Deflection—0.135 in.
g. Mold shrinkage—0.0031 in additional shrinkage after aging 48 hours at 220° F.—0.0029 in.
h. Taber abrasion resistance—0.020 to 0.030 grams loss per 1000 cycles
i. Arc resistance—79 secs.
j. Heat distortion—155° C.
k. Light stability—no discoloration after 50 hours exposure to General Electric S-1 Sunlamp

*Preparation of resin "A"*

1496 parts (8.0 mols) of benzoguanamine
1296 parts (16 mols) of aqueous formaldehyde (37%)
5 parts of 2 N aqueous sodium hydroxide solution The above ingredients are mixed together, heated to reflux in 40 minutes, and maintained at reflux (95–98° C.) for 130 minutes at which point the reaction mass becomes turbid. The resin solution is cooled and then dehydrated at a pressure of 15–24 cm. Hg for 86 minutes during which time the temperature rises to 120° C. The temperature is held at 120–123° C. for 5 minutes.

The resin is then poured onto trays to cool and, when cooled, it is hard, dry, brittle and transparent. This resin is ground to pass a 40-mesh screen. It is infinitely dilutable in benzene-denatured anhydrous alcohol ("2B alcohol") and has a water solubility, determined on a 0.37% dispersion in water at 25° C., of 2.1%. When the finely ground resin is put into a large quantity of water at 30° C. it does not cake.

EXAMPLE 4

40 parts of bleached hardwood sulfite pulp
60 parts of resin "B"
2.4 parts of benzoic acid
0.5 part of alum
1 part of zinc stearate
1 part of zinc sulfide
9960 parts of water The procedure of Example 1 is followed. The molded pieces have good appearance and flow properties.

*Preparation of resin "B"*

1309 parts (7.0 mols) of benzoguanamine
851 parts (10.5 mols) of aqueous formaldehyde, 37%
1.5 parts 0.5 N aqueous sodium hydroxide The benzoguanamine and aqueous formaldehyde (formalin) are mixed together in a suitable vessel and the slurry is adjusted with the sodium hydroxide to a pH of 6.7. It is then heated to reflux in 26 minutes and maintained at reflux (97° C.) for 3¼ hours at which point the resin solution, which has a pH of 7.9, becomes turbid. The reaction mass is cooled to 60° C. and concentrated at a pressure of 24 cm. Hg until the temperature rises to 120° C. The pressure is decreased to 15 cm. Hg and a temperature of 120°–125° C. is held for 25 minutes. The resin is then dumped into a shallow tray, cooled and ground.

EXAMPLE 5

The formulation of Example 4 except that resin "C" is substituted for resin "B," and the procedure follows that of Example 1. The molded pieces have good appearance and flow properties.

*Preparation of resin "C"*

1390 parts (10 mols) of propioguanamine
1620 parts (20 mols) of aqueous formaldehyde, 37%
963 parts of water
13 parts of aqueous sodium hydroxide The above ingredients are charged to a suitable vessel. The slurry which has a pH of 6.4 is heated to reflux in 40 minutes and maintained at reflux for 3 hours at which point the solution becomes turbid. It is adjusted to a pH of 8.2 with the sodium hydroxide, cooled to 68° C. and concentrated at a pressure of 24 cm. Hg until the temperature rises to 120° C. The pressure is decreased to 16 cm. Hg and the temperature held at 120°–132° C. for 43 minutes. The resin is poured onto shallow trays, cooled and ground.

EXAMPLE 6

294 parts (1.82 mols) of aqueous formaldehyde, containing about 37% HCHO by weight, was charged to a 500 ml. 3-necked reaction vessel equipped with a stainless steel agitator, reflux condenser, and thermometer, after which 366 parts (3.64 mols) of phenyl acetoguanamine was added. The agitator was turned on, and the mixture was heated to 60° C. in 20 minutes. The pH was adjusted to 8.5 to 9.5 with 10 ml. of 0.5 N NaOH, and heating was continued for 10 minutes to bring the reaction mass to reflux and to effect solution. Refluxing was continued for 90 minutes, at the end of which time the resin that formed became hydrophobic in situ. The pressure in the vessel was reduced to 240 mm. and heat applied to concentrate the resin. After 80 minutes, the resin temperature had risen to 120° C. The resin was heated at 120–130° C. at 240 mm. pressure until a small, pulverized sample did not coagulate on addition to water at 30° C. The resin was discharged from the kettle into trays, cooled, and ground in a mill to pass a 40-mesh screen.

A pulp resin pre-form was formed from this resin by first charging the following ingredients to a mixing tank equipped with a high-speed agitator.

| | Parts |
|---|---|
| Bleached hardwood sulfite pulp (as a 2% slurry in water) | 30.0 |
| Phenyl acetoguanamine-formaldehyde resin | 70.0 |
| Benzoic acid | 3.5 |
| Alum | 0.52 |
| Zinc stearate | 1.0 |
| Zinc sulfide | 5.0 |

Sufficient water was added to the mixture to make a final 1% solids slurry, and the slurry was thoroughly agitated until uniform. 6 x 6 handsheets were formed from this slurry on a typical papermaker's screen. The sheets were dried for about 16 hours at 25° C. followed by 1.5 hours at 75° C. Four-inch discs were die-cut from the dried sheets, charged to a mold and cured at 310° F. at 3750 p. s. i. for 20 minutes to form a $\frac{1}{16}''$ disc of good appearance. This disc was boiled in water for 30 minutes and showed no signs of attack.

EXAMPLE 7

A resin and pulp pre-form and molding were prepared from octanoguanamine-formaldehyde resin according to the procedure outlined in Example No. 6 except that the resin was prepared from 130 parts (1.6 mols) of 37% formalin and 168 parts (0.8 mol) of octanoguanamine. The final condition of concentration for this resin was: 75 minutes at 30 mm. pressure at 120°–130° C. The molded 4" discs again showed no sign of attack after 30 minutes in boiling water.

EXAMPLE 8

A resin and pulp pre-form were prepared from heptanoguanamine-formaldehyde resin following the procedure in Example No. 6 except that 26.6 parts (0.32 mol) of 37% formalin and 32.0 parts (0.16 mol) of heptanoguanamine were used. The final condition of concentration of this resin was 5 minutes at 240 mm. at 120°–130° C. The resin did not coagulate in 30° C. water and was therefore suitable for pulp preforming.

EXAMPLE 9

A resin was prepared from toluguanamine according to the procedure outlined in Example No. 6 except that 804 parts of toluguanamine and 648 parts of 37% formalin were reacted. These quantities were in the molar equivalents of 2 mols of formaldehyde per mol of toluguanamine. The resultant resin was very good in color and suitable for pulp-preforming work.

Certain other aminotriazine resins may be prepared according to the method disclosed and claimed herein, and used as the resin component of resin pulp pre-forms. In general, we have found suitable for our process aldehyde-condensation products of 4,6-diaminotriazines wherein the 2-position carries a substituent of such selected molecular weight that the triazine resin will be sufficiently water-insoluble and will, at the same time, cure to a hard product, i. e., a substituent having at least two carbon atoms, no more than seven carbon atoms in the case of alkyl substituents and up to about ten carbon atoms in the cases of other than alkyl substituents. If the molecular weight of this substituent is too low, the resin will be too soluble in water; if it is too high, the resin may not cure to a product of sufficient hardness for the intended purpose.

Examples of aminotriazines that can be used in carrying the present invention into effect are those represented by the following general formula:

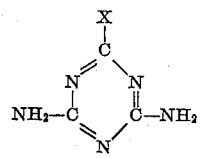

wherein X is:

(1) A straight or branched chain, saturated or unsaturated, aliphatic-hydrocarbon radical of from 2 to 7 carbon atoms as in, for example, propioguanamine, n-butyroguanamine, isobutyroguanamine, valeroguanamine, caproguanamine, heptoguanamine, capryloguanamine, etc.; or (2) A cycloaliphatic hydrocarbon radical as in, for example, Δ³-tetrahydrobenzoguanamine, hexahydrobenzoguanamine, 3-methyl-Δ³-tetrahydrobenzoguanamine, 3-methyl - hexahydrobenzoguanamine, 3,4 - dimethyl - Δ³-1,2,5,6 - tetrahydrobenzoguanamine, 3,4 - dimethyl-hexahydrobenzoguanamine; or (3) An aralkyl radical as in, for example, phenylacetoguanamine, etc.; or (4) An aryl radical as in, for example, benzoguanamine, the o-, m-, and p-toluguanamines, the alpha- and beta-naphthoguanamines, the o-, m- and p-xyloguanamines, etc.

While we prefer the use of formaldehyde either in aqueous solution or as paraformaldehyde for condensation with the above-indicated aminotriazines, other aldehydes or substances yielding an aldehyde, e. g., acetaldehyde, propionaldehyde, valeraldehyde, furfural, trioxane, paraldehyde, benzaldehyde, etc., may be employed. The combined molar ratios of aldehyde to aminotriazine will vary from about 1:1 to about 4:1, the preferred range being from about 1.5:1 to about 2.5:1. To obtain light-colored products, aldehydes should be used that impart little or no color to the product, e. g., formaldehyde.

The temperature of the reaction mass during the resin-forming condensation reaction should be sufficiently high to ensure dissolution of the initial reaction product in the solvent employed. This minimum temperature is about 60° C. The practical upper limit of the reaction temperature is the reflux temperature of the mass when the reaction is carried out at atmospheric pressure. If higher pressures are used, the temperature may be increased, but it should not be above about 200° C. The preferred temperature range is generally from about 80° C.– about 105° C. The reaction is caused to proceed to the desired endpoint under pH conditions ranging from about 4 to about 11, preferably from about 6 to about 9.

The endpoint of the aminotriazine-aldehyde condensation reaction for preparation of resins suitable for use in pulp resin pre-forms in accordance with our invention is extremely critical. The aminotriazine and aldehyde must be reacted at least to the point where, in finely powdered form, the condensation product will not coagulate or cake in water at about 20° C. In this connection it is noted that if a resin does not cake at a given temperature, it will not cake at any lower temperature. For convenience this testing of the finely ground resin for absence of caking in water at 20° C. will be referred to as the "coagulation test," and the endpoint so determined as the "coagulation endpoint."

At the same time, the resin should not be reacted beyond the point where the condensation product has a plasticity of about 60 mils, as determined by the following test:

A charge of fifty grams of the material at 20°–30° C. is placed in the center of the bottom platen of a molding press, both platens of which are at a temperature of 290°±2° F. and which are so shaped and grooved as to produce a flat molded disc with concentric ridges ½″ apart. The press is closed in 20 seconds and a force of 18 tons applied in 15 seconds and maintained during the cure time. At the end of the time required for cure, the piece is removed and cooled. The average measurement of the thickness taken in the ring about 2¼ inches from the center of the molded disc is recorded in mils as a measure of the plasticity. For convenience this testing of the plasticity or flow of the resin will be referred to as the "flow test"; and it is this test method which is meant in the appended claims by the term "Cyanamid test method."

The actual reaction time for the resin-forming condensation reaction will, of course, be dependent on various factors such as solids concentration, pH, temperature, and the like, but it is generally held to from about 10 minutes to about 1 hour.

The condensation reaction may be carried out in the absence of a solvent or, if desired, in the presence of such solvents as water or organic solvents including ketones, aldehydes, alcohols, hydrocarbons, esters, ethers, dioxane, etc., which are inert to, or do not form undesirable reaction products with, the resin-forming ingredients and the resin formed. Mixtures of any number of the organic-type solvents may also be used. We prefer to operate in the presence of water as a solvent and to avoid the use of alcohols or other hydroxyl-containing solvents.

Upon completion of the condensation reaction the resin, which will generally be in the form of an aqueous slurry, may be used immediately in the pulp resin preform process. However, if immediate use is not contemplated, it may be desirable to dry the resin. This may be effected by a spray-drying operation, by kettle dehydration, with or without vacuum, or by drum-drying. If either of the two latter expedients are employed, the resulting friable solid is ground or pulverized. In any case, when use is to be made of the resin, it is only necessary to add water to the dry product.

The coagulation endpoint is the final endpoint and as such includes both the heating time of reaction and the heating time of concentration. Thus, if a resin is to be used immediately in the pulp resin pre-form process and no concentration step is necessary, the condensation reaction itself is carried to the coagulation endpoint. However, if the resin slurry is to be concentrated for later use, the coagulation test is applied after both heating steps and not after the condensation reaction. In the latter instance involving concentration of the resin slurry, a simple test may be applied if the condensation reaction is carried out in an aqueous medium. The condensation is continued until the resin that forms becomes hydrophobic; this resin is then dried to the coagulation endpoint.

In order to prevent over-polymerization of the resin during the drying step, its pH should not be too low. It may not be necessary to adjust the pH if the condensation reaction was carried out at a pH above about 7, more particularly at a pH of from about 7 to about 11, but if the reaction was carried out in the pH range of from about 4 to less than about 7, it may be desirable to increase the pH to about 7 to 8.5 during drying.

In practicing our invention all of the triazine and aldehyde to be employed may be reacted initially or, if desired, a portion of the aydehyde may be reacted initially with the triazine and the remaining added during a later stage of the process.

Modifiers may be added at any suitable stage in the process. They may be present from the beginning in the first stage, they may be added to the resin during or after dehydration thereof, or they may even be mixed with the pulp resin slurry. Such modifiers include alkyd resins, oil-modified alkyd resins and other polyesters such as pentaerythritol sebacate, glyceryl phthalate-modified glycerol-triethylene glycol-sebacate, castor oil-modified glycerol-diethylene glycol-sebacate, ethylene glycol fumarate phthalate, ethylene glycol fumarate adipate, lauric acid-modified pentaerythritol phthalate, etc.; polyvinyl compounds such as polyvinyl acetate, polyvinyl alcohol, reaction products of polyvinyl alcohol with aldehydes, e. g., polyvinylbutyral, polyvinylacetal, polyvinylformal, etc.; other synthetic resins including copolymers of unsaturated alkyd resins with polymerizable unsaturated monomers such as the diallyl phthalate copolymer of a resin prepared from ethylene glycol, diethylene glycol, fumaric acid and phthalic anhydride, etc., melamine-, urea-, acetone-, aniline- and modified aniline-formaldehyde resins, phenol-formaldehyde resins, epichlorohydrin-polyamine resins, and the like; cellulose derivatives such as cellulose acetate, cellulose acetate-butyrate, cellulose nitrate, etc.; natural resins and waxes such as rosin derivatives including wood rosin, polypale rosin and di- and tri-ethylene glycol dihydroabietate, Batavia damar, shellac, etc.; natural and synthetic rubber as butadiene-acrylonitrile copolymers, polyacrylonitrile, etc.; copolymers of styrene with butadiene, with isobutylene, with ethyl acrylate, with n-butyl acrylate, etc.; and the like. The aminotriazine resins prepared as disclosed herein should constitute at least 50% by weight of the total resin and modifier.

The preparation of the pulp resin slurry composition used in making the pulp resin pre-forms may be varied within certain limitations.

The particular filler used may be varied but in order to obtain good mechanical strength, long-fibered fillers such as wood fibers, asbestos, glass fiber, chopped rag, chopped cord, cellulose fibers, and the like are preferred. Other fillers which may be used either alone or in conjunction with these long-fibered fillers include clay, pigments, talc, mica, etc. The weight ratio of resin to filler may vary from about 25:75 to about 80:20. The preferred weight ratio is about 60:40 to about 70:30, when a long-fibered cellulose filler is used and the pre-forms are to be used for surfacing. With this high resin content good appearance and water- and solvent-resistance are obtained. When highest strength is desired and optimum water-resistance is of secondary importance, a lower resin content is desirable.

The solids concentration of the slurry is dependent on the type of filler used, but in general it may be varied from about 0.1% to about 30% by weight of the slurry, the preferred concentration being about 0.2% to about 1%, when a long-fibered cellulose filler is used.

An acid catalyst such as benzoic acid, salicylic acid, oxalic acid, phthalic anhydride, etc., or a catalyst possessing latent acidity such as ammonium chloride, o-sulfamidomethylbenzoate, monochloroacetyl urea, cinnamhydroxamic acid, etc., is preferred for use in the preparation of the resin pulp pre-forms since a resin pH of from about 3 to 6 is necessary for a good cure of the resin. It is an advantage of the curable resins used in practicing the present invention that it is not necessary to add an alkaline buffer to the composition as is necessary with similar compositions containing melamine resin. When a catalyst is used, up to about 5% by weight of catalyst, based on the resin, is generally suitable. However, when the pH of the resin is itself sufficiently low—depending upon the type of reaction, modifiers present, kind of filler used, etc.—no catalyst may be needed.

The pulp resin slurry may be modified by the addition of pigments, paraformaldehyde, wetting agents and other modifiers. Alum is very useful in obtaining good dispersion and dispersion stability and, when so used, preferably constitutes about 0.5%–3% by weight, based on the weight of the solids content of the slurry.

The drying of the pre-forms should be conducted at such temperatures and for such periods of time as to provide products having a minimum volatile content and good flow properties. Methods of determining optimum drying conditions are those common in the art. A conditioning period at moderately low humidity is desirable since this tends to equalize differences in volatile content and flow.

The procedure for utilization of the pulp resin pre-forms is more or less conventional and is set forth in the aforementioned Patent No. 2,274,095. A single pre-form may be molded by application of heat and pressure thereto or a plurality of pre-forms, all containing one or more aminotriazine resins produced as hereinbefore described, may be consolidated and combined in a molding operation. Moreover, the aminotriazine resin pulp pre-forms described in the present specification may be used in conjunction with, and particularly as surface sheets on, materials such as, for example, phenolic resins, lignin, aniline-formaldehyde condensation products, mixed aniline-phenol-formaldehyde condensation products, mixed aniline-lignin-phenol-formaldehyde resins, and the like. This latter is the preferred method of application of the hereindescribed aminotriazine resin pulp pre-forms. The resins commonly used as core materials are not only strong but also relatively cheap, so an inexpensive laminated product can be obtained with no sacrifice of good properties.

The triazine resins herein involved possess advantages over both phenolic and melamine resins when used in the production of resin pulp preforms. The pulp pre-forms containing these resins require less pressure for molding than do similar melamine resin pre-forms. As has already been pointed out, pulp preforms containing melamine resins are too viscous and do not have the good flow properties which are characteristic of pulp pre-forms containing the particular aminotriazine resins of the present invention. Furthermore, the preferred resins make possible the production of light-colored, light-stable, high-impact molded and/or laminated articles by a resin pulp pre-form process. The light color and color stability (resistance to discoloration) of such articles is in marked contrast to similar articles in which the resin component is a phenolic resin and which are generally dark-colored or, if originally light in color, are susceptible to discoloration on aging. The finished articles containing the cured (more particularly heat-cured) resins of this invention have improved arc resistance over the corresponding phenolic moldings or laminates and, moreover, they are far less susceptible to burning than phenolics.

The results of the following series of tests are presented to show that not all aminotriazines are suitable for use in practicing the present invention and, also, to show that the chosen aminotriazine must be reacted with an aldehyde, specifically formaldehyde, under particular conditions to a particular endpoint in order to obtain the desired curable resinous material. The tests and test-conditions are described briefly below:

(1) A series of nine resins was prepared, three from benzoguanamine, three from acetoguanamine, and three from melamine, by heating the aminotriazine with aqueous formaldehyde in the presence of an alkali in a 1:2 molar ratio to different endpoints which were below, above and within the limits set forth above and in the accompanying claims.

(2) Using the composition of Example 3 of the present specification and the procedure of Example 1, resin pulp preforms were prepared from each of the nine resins. The pre-forms were dried for one hour at 70° C., conditioned for about 64 hours at 25° C. at 46% relative humidity and then molded by subjecting them to a pressure of 3700 p. s. i. at a temperature of 310° F. for 15 minutes (45 seconds of which was a pre-heat and an additional 10 seconds of which was a breathe immediately following the pre-heat).

(3) Because neither the formulation nor the cure cycle described above represents the best possible conditions for preparing pulp pre-forms from melamine resin, three additional pulp pre-forms were prepared and molded from the melamine resin best suited for pre-form application, one omitting the benzoic acid catalyst but subjected to the 15-minute cure cycle and two others, one containing catalyst and one not containing catalyst, submitted to a short cure cycle of only 4 minutes with no pre-heat and no breathe.

The results are summarized in the following table:

| Disc Identification | Resin Type | (a) Coagulation Temp. in H₂O | (a) Resin Flow, mils (Cyanamid test method) | Sheet Preparation Catalyst | Sheet Preparation Remarks | (b) Resin Content Percent (Calc. from Wt.) | (c) Cure Cycle Preheat, seconds | (c) Cure Cycle Total Cure Time, minutes | Disc Appearance |
|---|---|---|---|---|---|---|---|---|---|
| A | Benzo-guanamine, F/BG 2.0. | 15–18 | less than 20. | Yes | Lumped badly. Resin particles adhered to screen. Not practical. | 47.6 | 45 | 15 | Not entirely filled out. Fair. |
| B | Benzo-guanamine, F/BG 2.0. | 90 | 43 | yes | O. K. | 51.2 | 45 | 15 | Good. |
| C | Benzo-guanamine, F/BG 2.0. | more than 90. | 63 | yes | O. K. | 52.2 | 45 | 15 | Poor. Dry spots. Blistered, popped. |
| D | Aceto-guanamine, F/AG 2.0. | less than 0 (dissolved). | less than 20. | yes | Most of resin dissolved, very little in sheet. | 25.2 | 45 | 15 | Poor. Not filled out. Dry: little resin. |
| E | Aceto-guanamine, F/AG 2.0. | 60–62 | 45 | yes | Slow drain. Slight sticking of resin to screen. | 51.2 | 45 | 15 | Poor. Blistered. |
| F | Aceto-guanamine, F/AG 2.0. | 67–72 | 64 | yes | Slow drain. | 51.5 | 45 | 15 | Poor. Blistered, popped. Dry spots. |
| G | Melamine, F/M 2.0. | less than 0 (most dissolved). | less than 20. | yes | Most of resin dissolved, very little in sheet. | 26.6 | 0 | 4 | Poor. Not filled out. Dry: little resin. |
| H | Melamine, F/M 2.0. | 20–23 | 52 | yes | Tendency to lump. Resin settles out from slurry on standing. | 50.2 | 45 | 15 | Poor. Dry at edge. Stiff. Resin unevenly distributed because of stiffness. |
| I | Melamine, F/M 2.0. | 20–23 | 52 | No | do | 51.8 | 45 | 15 | Poor. Similar to H. |
| J | Melamine, F/M 2.0. | 20–23 | 52 | yes | do | 50.2 | 0 | 4 | Do. |
| K | Melamine, F/M 2.0. | 20–23 | 52 | No | do | 51.8 | 0 | 4 | Poor. Only slightly better than H, otherwise similar. |
| L | Melamine, F/M 2.0. | 42–45 | 65 | yes | O. K. | 51.9 | 0 | 4 | Poor. Stiff, dry. Not filled out. |

(a) Tests described hereinbefore.
(b) Calculated from weight of dried sheet.
(c) Where a preheat was used, a 10-second breathe immediately following the preheat was used.

We claim:
1. The method which comprises initiating reaction between ingredients comprising (1) an aqueous solution of formaldehyde and (2) an aminotriazine represented by the general formula

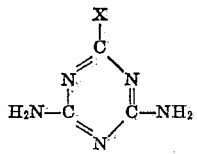

where X represents a radical selected from the class consisting of (a) cycloaliphatic hydrocarbon radicals, (b) aralkyl hydrocarbon radicals, (c) aryl hydrocarbon radicals, the aforesaid radicals of (a), (b) and (c) each having not more than about 10 carbon atoms, and (d) acyclic hydrocarbon radicals containing from 2 to 7 carbon atoms, inclusive; continuing the reaction between the said ingredients under pH conditions ranging from about 6 to about 9 and at a temperature of from about 80° C. to about 105° C. until a curable resinous condensation product is produced, a sample of which has a plasticity not exceeding about 60 mils as determined by the Cyanamid test method and which also, in finely powdered form, will not cake in water at 20° C., the ingredients of (1) and (2) being employed in a molar ratio of from about 1.5:1 to about 2.5:1; incorporating ingredients including the aforesaid resinous condensation product into an aqueous pulp composition; shaping the resulting resin-containing pulp composition; and drying the shaped composition to produce a resin-pulp preform.

2. A method as in claim 1 which includes the final step of molding the resin-pulp preform under heat and pressure to cure the resin in situ and to consolidate the mass.

3. A method as in claim 1 wherein the resinous condensation product, when it is incorporated into the pulp composition, is in the form of an aqueous slurry.

4. A method as in claim 1 wherein the resinous condensation product is dehydrated prior to incorporation into the aqueous pulp composition.

5. A method as in claim 1 wherein the resinous condensation product and filler content of the aqueous pulp composition are in a weight ratio of resinous condensation product to filler of from about 25:75 to about 80:20.

6. A method as in claim 1 wherein a curing catalyst is included among the ingredients which are incorporated into the aqueous pulp composition in addition to the resinous condensation product.

7. A method as in claim 6 wherein the curing catalyst is benzoic acid.

8. A method as in claim 6 wherein the curing catalyst is oxalic acid.

9. A method as in claim 1 wherein the aminotriazine of (2) is benzoguanamine.

10. A method as in claim 1 wherein the aminotriazine of (2) is propioguanamine.

11. A method as in claim 1 wherein the aminotriazine of (2) is phenyl acetoguanamine.

12. A method as in claim 1 wherein the aminotriazine of (2) is octanoguanamine.

13. A method as in claim 1 wherein the aminotriazine of (2) is toluguanamine.

14. The product of the method of claim 1.
15. The product of the method of claim 2.

References Cited in the file of this patent

UNITED STATES PATENTS

| | | |
|---|---|---|
| 2,197,357 | Widmer | Apr. 16, 1940 |
| 2,302,162 | Zerweck | Nov. 17, 1942 |
| 2,385,765 | Thurston | Sept. 25, 1945 |
| 2,448,338 | Widmer | Aug. 31, 1948 |

FOREIGN PATENTS

| | | |
|---|---|---|
| 567,063 | Great Britain | Jan. 26, 1945 |
| 104,382 | Australia | July 7, 1938 |